(12) United States Patent
Williams et al.

(10) Patent No.: US 9,156,379 B2
(45) Date of Patent: Oct. 13, 2015

(54) CHILD SAFETY SEAT ASSEMBLY

(75) Inventors: Bruce L. Williams, Narvon, PA (US);
Gregory S. Sellers, Christiana, PA (US);
Nathanael Saint, Elverson, PA (US);
Sharon A. Gillett, Mohnton, PA (US)

(73) Assignee: Wonderland Nurserygoods Company Limited (HK)

( * ) Notice: Subject to any disclaimer, the term of this patent is extended or adjusted under 35 U.S.C. 154(b) by 593 days.

(21) Appl. No.: 13/181,685

(22) Filed: Jul. 13, 2011

(65) Prior Publication Data
US 2012/0013154 A1  Jan. 19, 2012

Related U.S. Application Data

(60) Provisional application No. 61/399,663, filed on Jul. 15, 2010, provisional application No. 61/461,410, filed on Jan. 18, 2011.

(51) Int. Cl.
*B60N 2/26*  (2006.01)
*B60N 2/28*  (2006.01)

(52) U.S. Cl.
CPC ............ *B60N 2/2845* (2013.01); *B60N 2/2821* (2013.01); *B60N 2/2863* (2013.01); *B60N 2/2875* (2013.01)

(58) Field of Classification Search
USPC ................ 297/250.1, 256.16, 256.14, 256.1, 297/256.12, 256.13, 423.2, 423.22
See application file for complete search history.

(56) References Cited

U.S. PATENT DOCUMENTS

| | | | |
|---|---|---|---|
| 4,743,063 A | 5/1988 | Foster, Jr. | |
| 4,915,446 A | 4/1990 | Darling et al. | |
| 4,943,113 A | 7/1990 | Meeker | |
| 5,052,750 A | 10/1991 | Takahashi et al. | |
| 5,385,387 A | 1/1995 | Kain | |
| 5,468,014 A * | 11/1995 | Gimbel et al. | 280/735 |
| 5,494,331 A | 2/1996 | Onishi et al. | |
| 5,772,279 A | 6/1998 | Johnson, Jr. | |
| 6,017,088 A | 1/2000 | Stephens et al. | |
| 6,030,047 A | 2/2000 | Kain | |
| 6,070,890 A | 6/2000 | Haut et al. | |
| 6,367,875 B1 * | 4/2002 | Bapst | 297/250.1 |
| 6,491,403 B2 * | 12/2002 | Edgar | 359/872 |
| 6,854,744 B2 * | 2/2005 | Brandler | 280/30 |
| 6,863,345 B2 | 3/2005 | Kain | |
| 6,938,915 B2 * | 9/2005 | Bischoff et al. | 280/658 |
| 6,971,655 B1 * | 12/2005 | Harris | 280/47.25 |
| 7,163,265 B2 | 1/2007 | Adachi | |
| 7,354,049 B2 * | 4/2008 | Schmidt | 280/33.993 |

(Continued)

FOREIGN PATENT DOCUMENTS

| | | |
|---|---|---|
| AU | 56207/96 B | 1/1997 |
| AU | 721501 B2 | 7/1998 |

(Continued)

*Primary Examiner* — David R Dunn
*Assistant Examiner* — Jody Giacoman
(74) *Attorney, Agent, or Firm* — David I. Roche; Baker & McKenzie LLP

(57) ABSTRACT

A child safety seat assembly comprises a child seat, a base adapted to assemble with the child seat, wherein the base includes a first portion having an enlarged bottom, and an inclined second portion joined with an upper side of the first portion and provided with a storage pocket, and an abuttal support operable to slide relative to the base between a first position stowed in the storage pocket and a second position deployed outward.

24 Claims, 10 Drawing Sheets

(56) References Cited

U.S. PATENT DOCUMENTS

| | | |
|---|---|---|
| 7,513,512 B2 | 4/2009 | Yoshie et al. |
| 7,540,507 B1 * | 6/2009 | Kennedy ............................ 280/30 |
| 7,597,396 B2 * | 10/2009 | Longenecker et al. ........ 297/253 |
| 7,658,389 B2 * | 2/2010 | Ostrow et al. ............... 280/47.25 |
| 8,544,941 B2 * | 10/2013 | Coote et al. ................... 297/118 |
| 2004/0173997 A1 * | 9/2004 | Voll ............................... 280/652 |
| 2004/0207241 A1 | 10/2004 | Sedlack |
| 2008/0136234 A1 * | 6/2008 | Hutchinson et al. ...... 297/256.13 |
| 2009/0102257 A1 | 4/2009 | Collias |
| 2010/0007187 A1 | 1/2010 | Hutchinson et al. |
| 2010/0019547 A1 * | 1/2010 | Gray et al. ..................... 297/118 |

FOREIGN PATENT DOCUMENTS

| | | |
|---|---|---|
| CN | 200948756 Y | 9/1997 |
| CN | 201124778 Y | 10/2008 |
| CN | 101311029 A | 11/2008 |
| CN | 201151354 Y | 11/2008 |
| EP | 609889 A1 | 4/1994 |
| EP | 631903 B1 | 10/1996 |
| GB | 2270466 A | 3/1994 |
| GB | 2202433 A | 9/1998 |

* cited by examiner

CHILD SAFETY SEAT ASSEMBLY

CROSS-REFERENCE TO RELATED APPLICATION(S)

This application claims priority of U.S. provisional application No. 61/399,663 filed on Jul. 15, 2010, and U.S. provisional application No. 61/461,410 filed on Jan. 18, 2011.

BACKGROUND OF THE INVENTION

1. Field of the Invention

The present invention relates to child safety seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which is more adapted to provide protection for the young child.

The child safety seat usually includes a seat portion and a base connected underneath the seat portion. When it is installed in the vehicle, it is usually recommended to place the seat portion facing rearward for better protection against collision. However, when collision occurs (especially from the rear of the vehicle), this rearward facing placement may create a pivot point at the contact between the front of the seat portion and the seatback of the vehicle seat, which may cause the safety seat to unstably lift from the vehicle seat.

Therefore, there is a need for a child safety seat assembly that can be safer in use and address at least the foregoing issues.

SUMMARY

The present application describes a child safety seat assembly that can to provide improved safety in use. In one embodiment, the child safety seat assembly comprises a child seat, a base adapted to assemble with the child seat, wherein the base includes a first portion having an enlarged bottom, and an inclined second portion joined with an upper side of the first portion and provided with a storage pocket, and an abuttal support operable to slide relative to the base between a first position stowed in the storage pocket and a second position deployed outward.

At least one advantage of the structures described herein is the ability to provide a child safety seat assembly that is safer and convenient in use. The deployed abuttal support can be advantageously used as footrest, and also provide improved abuttal support against a seatback of the vehicle. Accordingly, the child safety seat assembly can be installed facing rearward in a stable and secure manner.

DETAILED DESCRIPTION OF THE EMBODIMENTS

Figure 1:
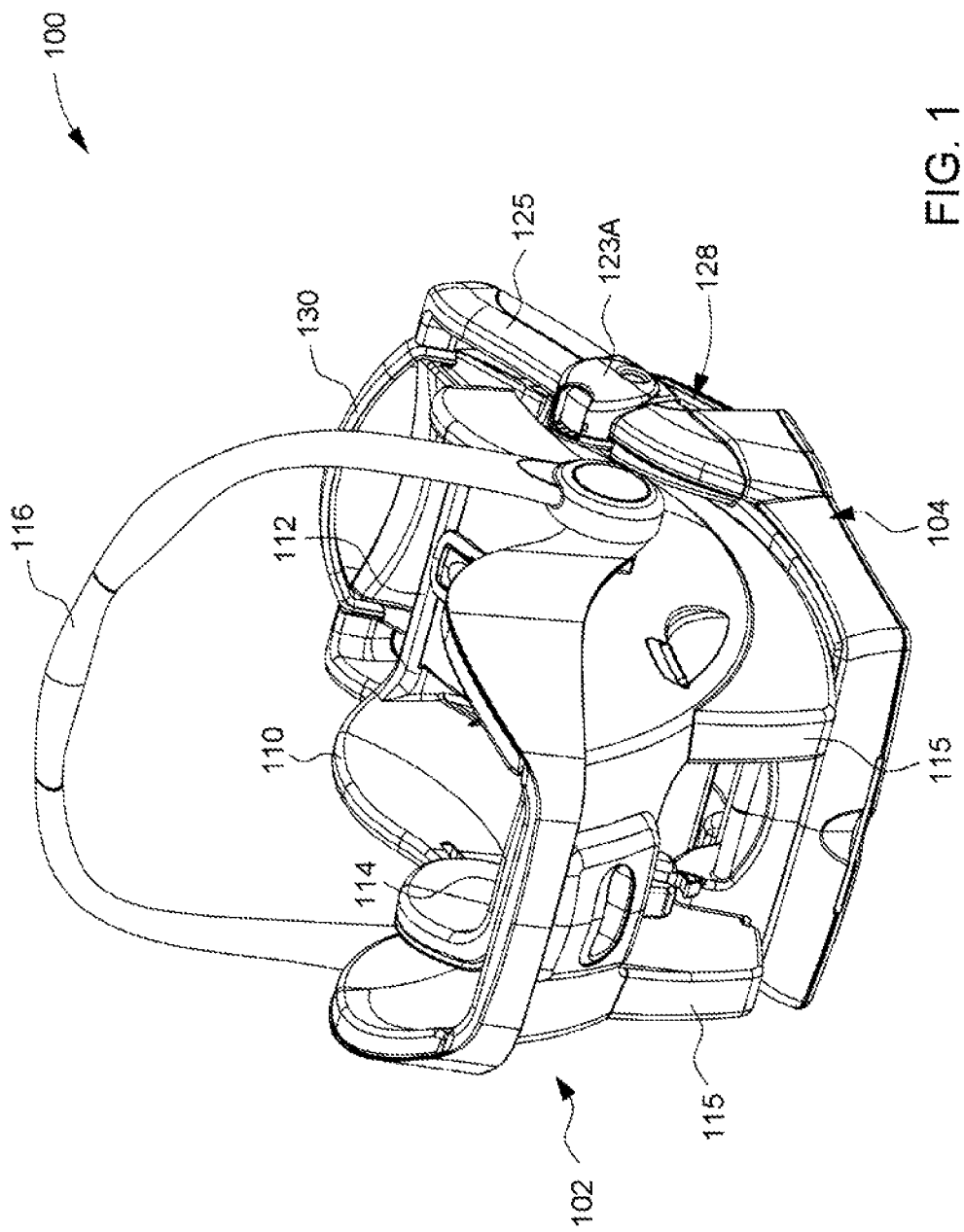
FIG. 1 is a perspective view illustrating an embodiment of a child safety seat assembly.

FIG. 1 is a perspective view illustrating an embodiment of a child safety seat assembly 100. The child safety seat assembly 100 includes a child seat 102 and a base 104. The child seat 102 includes a seat shell 110 having a seat portion 112 and a seatback 114. The seat shell 110, including the seat portion 112 and the seatback 114, can be formed in a single body by plastic molding. In the embodiment illustrated herein, the seat shell 110 can be provided with a fastener system (not shown) that is assembled adjacent to protruding rails 115 formed at an underside of the seat shell 110. This fastener system may be operable to attach the child seat 102 with the base 104 in a detachable manner, whereby the child seat 102 may be installed on the base 104 in different configurations of use, for example facing forward or rearward. A handle 116 may also be provided on the child seat 102 to facilitate its portability.

Figure 2:
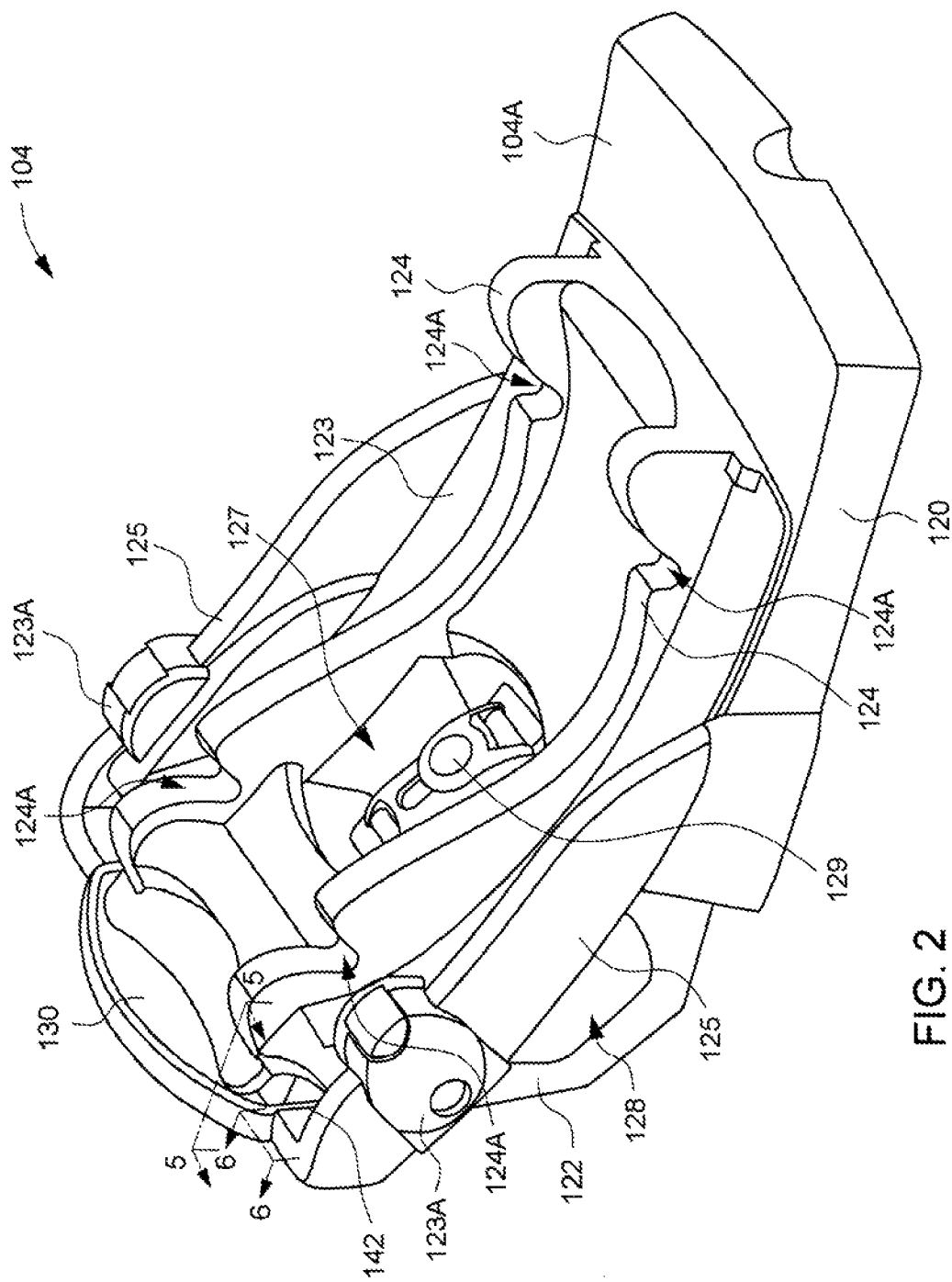
FIG. 2 is a perspective view of the base.
Figure 3:
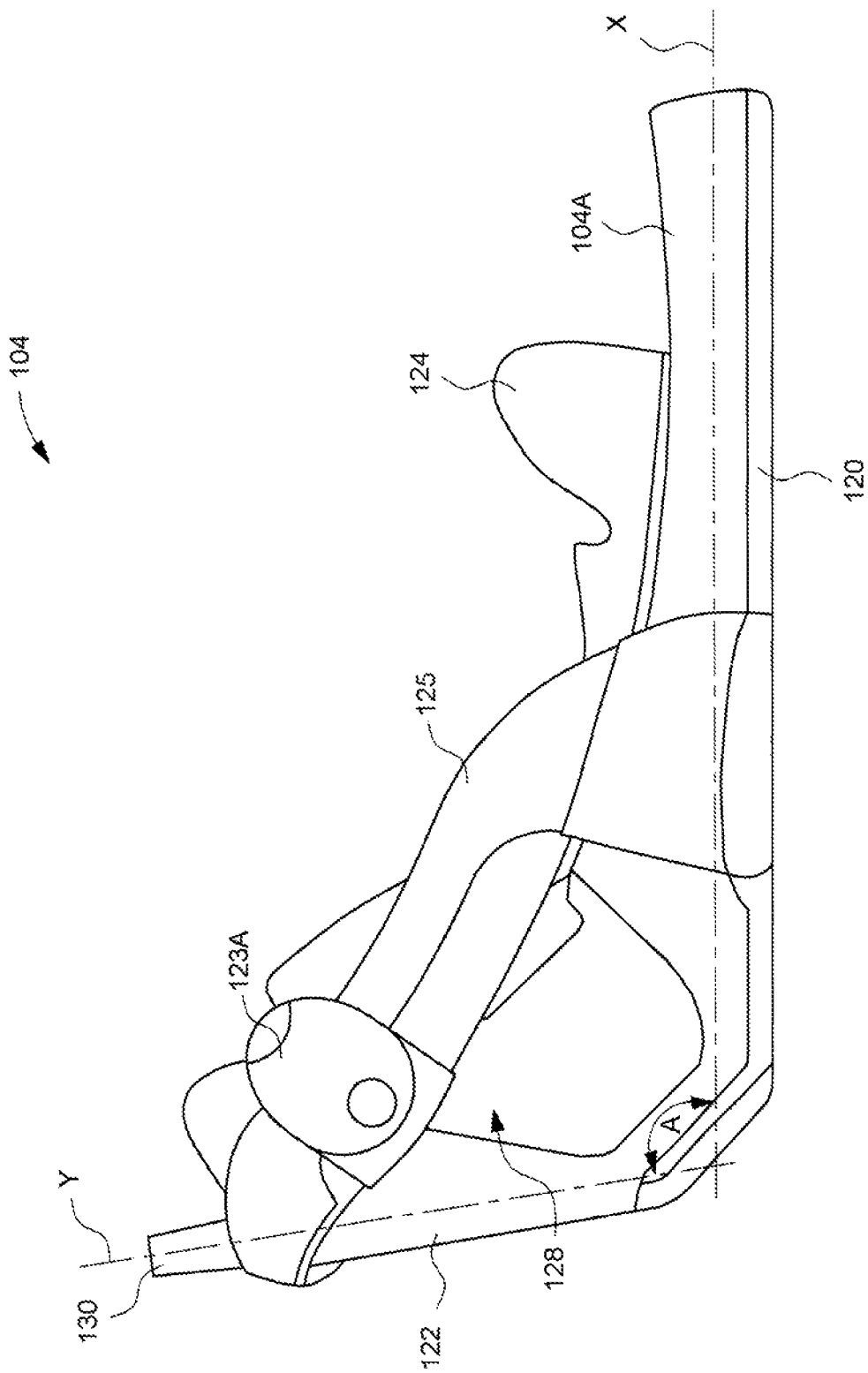
FIG. 3 is a side view of the base.

In conjunction with FIG. 1, FIGS. 2 and 3 are respectively perspective and side views illustrating the base 104 alone. The base 104 can include a first portion 120, and a second portion 122 joined with the first portion 120. The first portion 120 may extend in a generally horizontal first direction X, and can have an enlarged bottom to provide stable support when the base 104 is placed on a support surface, for example a seat of a vehicle. An upper side of the base 104 can include a support platform 123 that has two guide rails 124 protruding parallel, and is adapted to receive the placement of the child seat 102. Once the child seat 102 is installed on the base 104 in alignment with the guide rails 124, the fastener system provided in the seat shell 110 (not shown) can come into locking engagement with a catch structure formed in recessed grooves 124A of the guide rails 124 to hold the child seat 102 in place.

In one embodiment, the support platform 123 on which the guide rails 124 are formed may be movable to permit adjustment of the child seat 102 relative to the base 104. For example, the base 104 can include a shell body 104A provided with elongated arms 125 at left and right sides, whereas the support platform 123 can have left and right sides respectively mounted with sockets 123A that are movably assembled with the elongated arms 125 to guide movements of the support platform 123 relative to the shell body 104A. When the child seat 102 is installed in a configuration where the front of the child seat 102 is oriented toward the second portion 122 of the base 104, the support platform 123 may be adjusted to move the child seat 102 either in a first direction away from the second portion 122 to reduce the inclination of the child seat 102 relative to the base 104, or in a second direction toward the second portion 122 to recline the child seat 102.

As shown in FIG. 2, the base 104 can include a transverse channel 127 to that communicates with two opposite side openings 128 through which a harness strap may be passed to restrain the base 104 in place on a vehicle seat. An anchor fastener 129 provided at a central region of the transverse channel 127 can be operable to attach with the harness strap, whereby relative movements between the base 104 and the harness strap can be prevented.

The second portion 122 rises from an end of the first portion 120, and generally extends above an upper side of the first portion 120 in a second direction Y that is inclined an angle A relative to the first direction X of the first portion 120. The angle A can be at least equal to or greater than 90 degrees. The second portion 122 can be provided with an abuttal support 130 that is operable to move relative to the base 104 between a first position substantially received in the second portion 122, and a second position deployed outside the second portion 122.

Figure 4A:
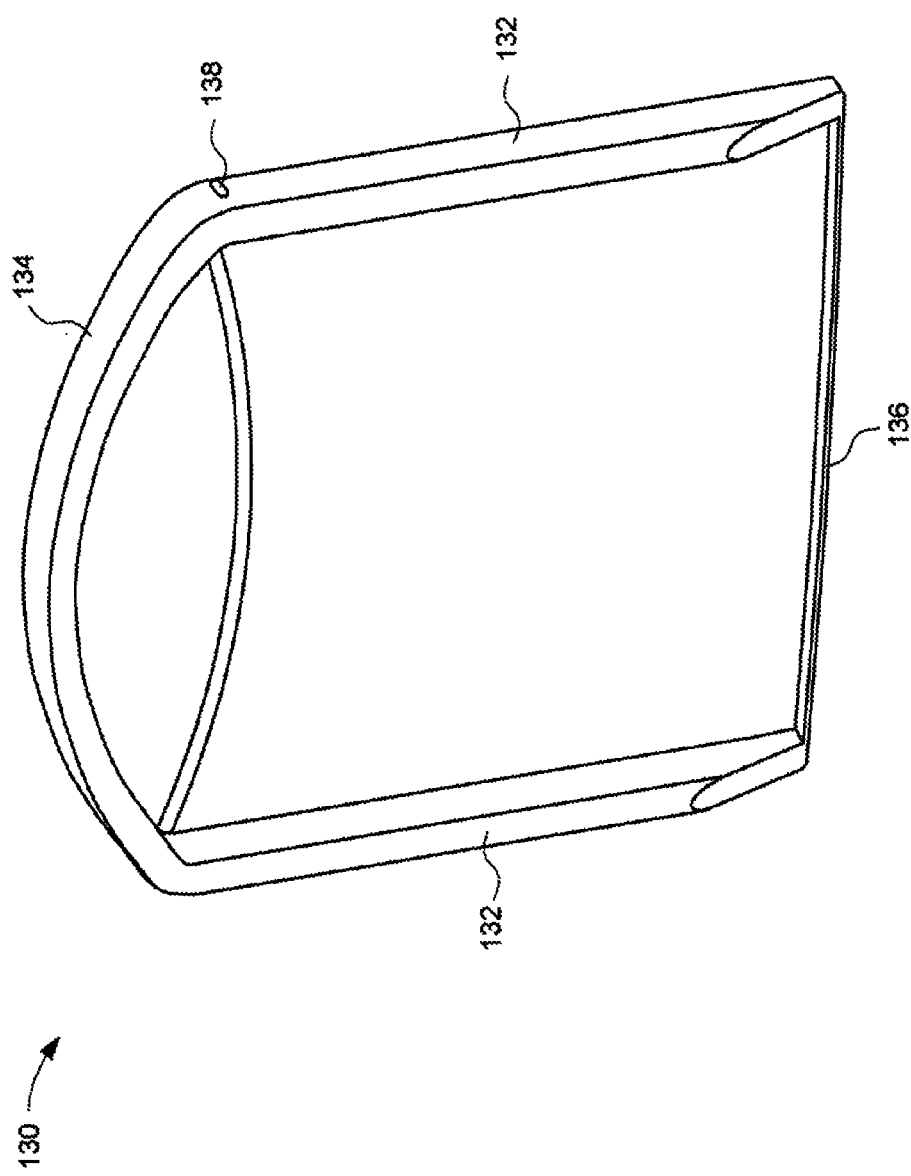
FIG. 4A is a schematic view illustrating a first of the abuttal support.
Figure 4B:
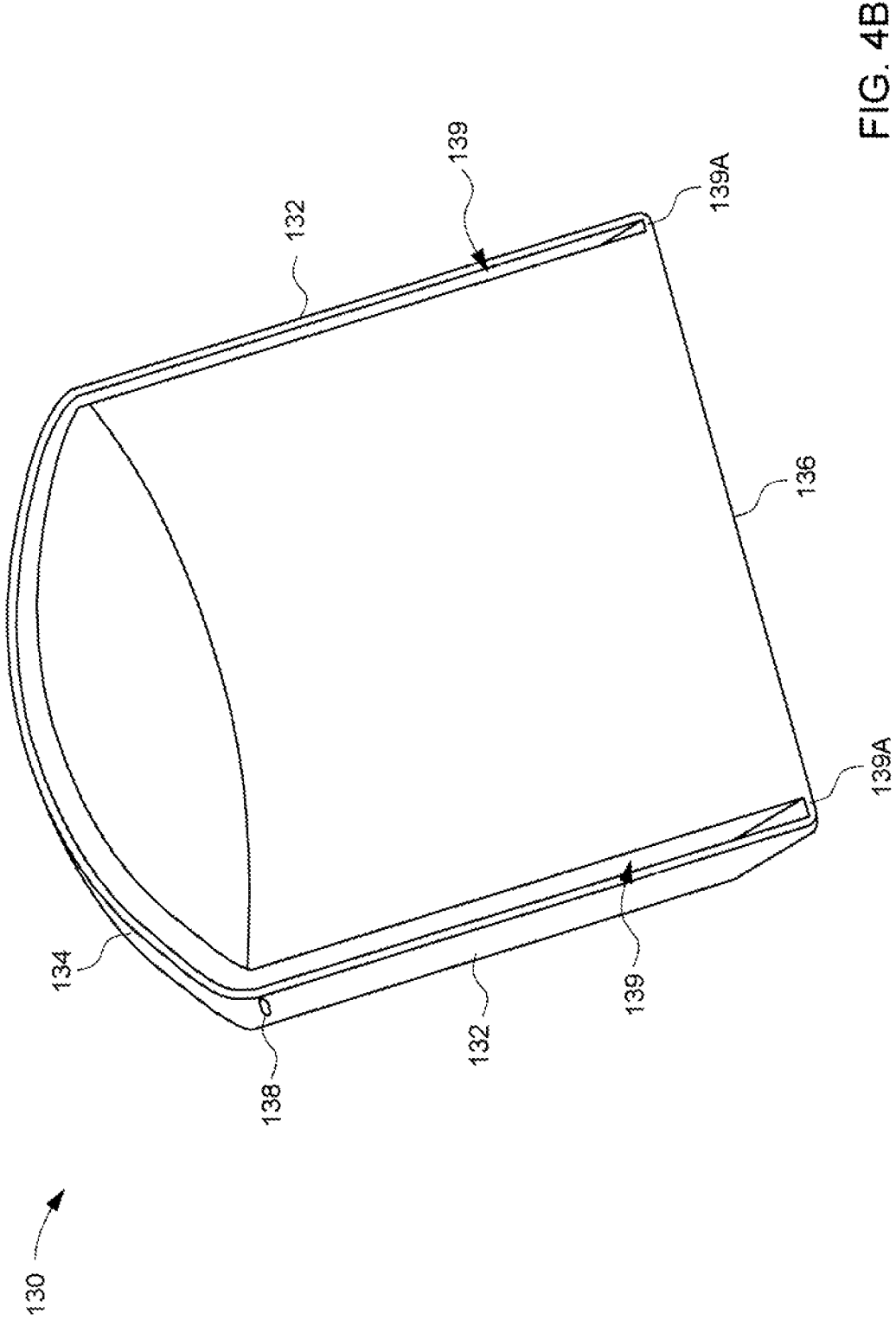
FIG. 4B is a schematic view illustrating a second side of the abuttal support opposite to the first side shown in FIG. 4A.

FIG. 4A is a schematic view illustrating a first side of the abuttal support 130, and FIG. 4B is a schematic view illustrating a second side of the abuttal support 130 opposite to that shown in FIG. 4A. The abuttal support 130 can be formed integrally by plastic molding with a plate shape. The abuttal support 130 can have two opposite side edges that are respectively provided with lengthwise rails 132 parallel to each other and protruding from the first side of the abuttal support 130. A top or first transverse edge of the abuttal support 130 extending between the two rails 132 may form a grip handle 134 for facilitating operation of the abuttal support 130. A second transverse edge at a side opposite to the grip handle 134 can form a flange 136 adapted to abut with a corresponding structure provided in an interior of the second portion 122 (as better shown in FIG. 4) to hold the abuttal support 130 in a second to position deployed outside the second portion 122. In addition, the abuttal support 130 can include one or two lateral protrusions 138 respectively formed on the outer surface of one or both rails 132 proximate to the grip handle 134. The lateral protrusions 138 can be squeezed against an inner sidewall surface of the second portion 122 (as better shown in FIG. 6) to create an interference fit that holds the abuttal support 130 in a first position stowed in the second portion 122 of the base 104.

As shown in FIG. 4B, the second side of the abuttal support 130 can include two elongated slits 139 that respectively extend along the positions of the rails 132 and are opened on the second side of the abuttal support 130. Each of the slits 139 can have a lower end defined by an edge portion 139A of the abuttal support 130, which may be at the same level as the flange 136.

Figure 5:
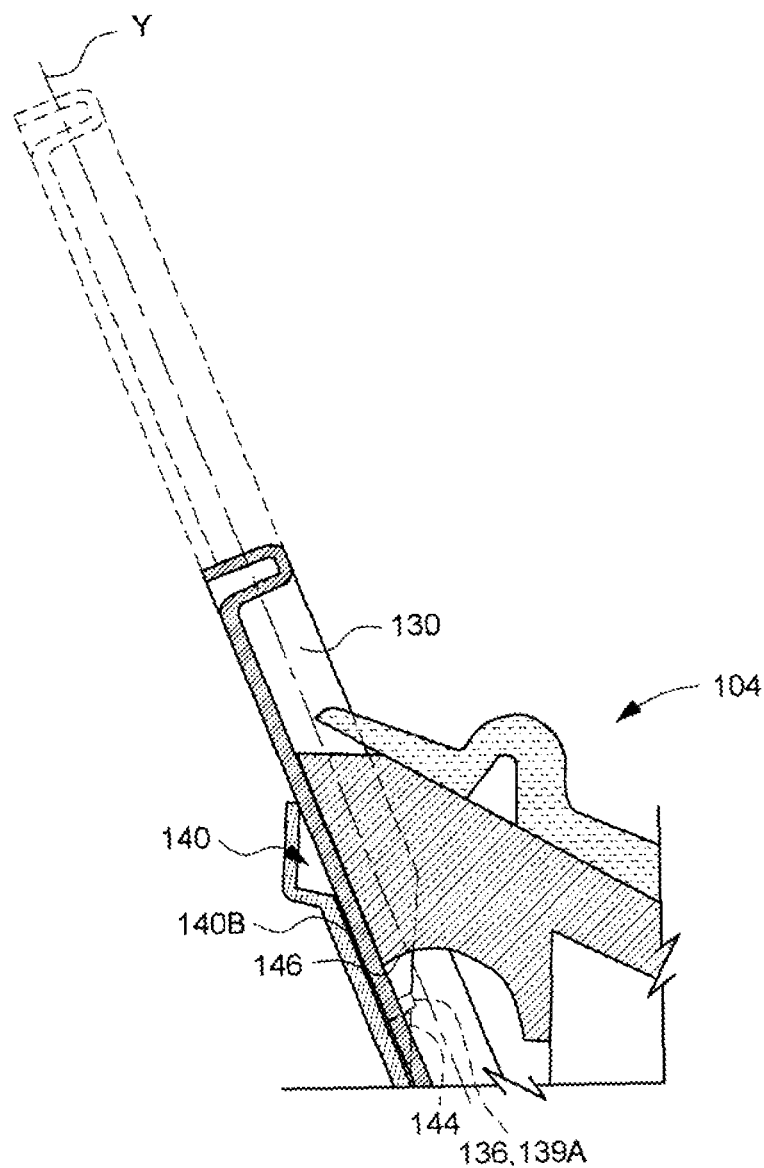
FIG. 5 is a partial cross-sectional view taken along section 5-5 shown in FIG. 2.
Figure 6:
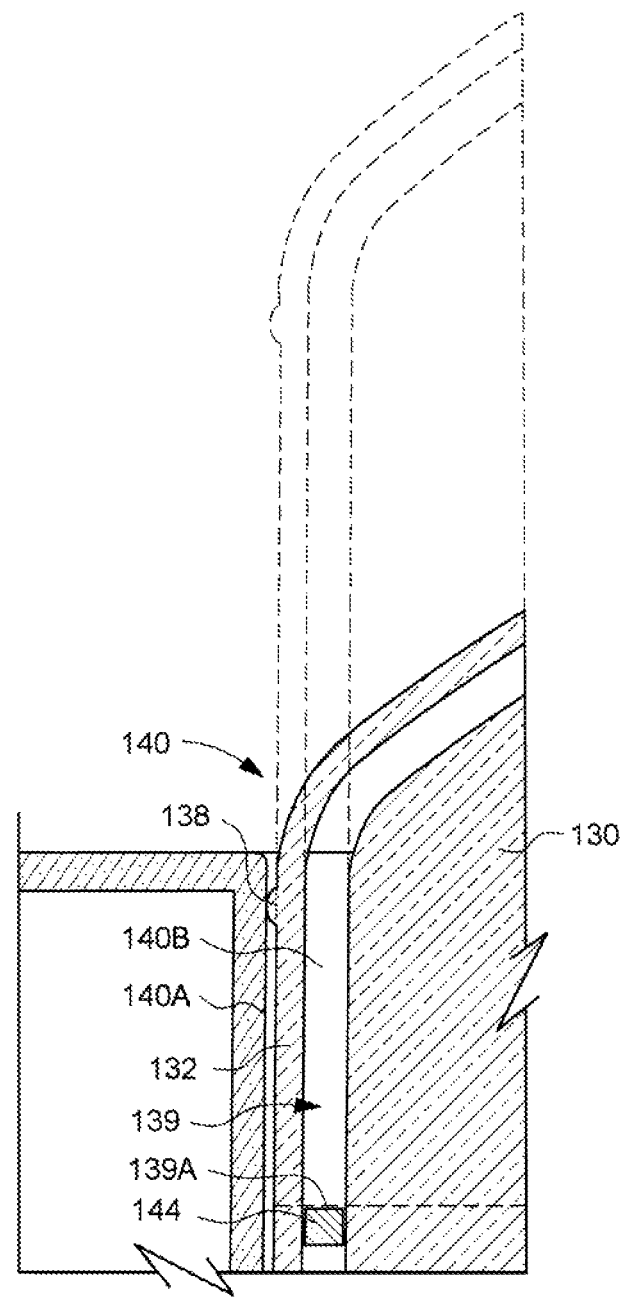
FIG. 6 is a partial cross-sectional view taken along section 6-6 shown in FIG. 2.

FIGS. 5 and 6 are cross-sectional views respectively taken along sections 5-5 and 6-6 shown in FIG. 2 to illustrate in more details the assembly of the abuttal support 130 with the base 104. Referring to FIGS. 2, 5 and 6, the second portion 122 of the base 104 can include a storage pocket 140 that is opened at a top of the second portion 122 and is sized to receive the abuttal support 130. Two opposite sides of the storage pocket 140 can be constructed to include a structure of guide slots 142 (better shown in FIG. 2) through which the rails 132 of the abuttal support 130 can be respectively engaged in a movable manner. The storage pocket 140 can have left and right side borders defined by two opposite inner sidewall surfaces 140A (only the left sidewall surface 140A is shown in FIG. 6, the right side one being symmetrical on the other side), and a major inner sidewall surface 140B transversally connected between the two sidewall surfaces 140A. When the abuttal support 130 is assembled through the storage pocket 140, the second side of the abuttal support 130 (i.e., the one shown in FIG. 4B) lies adjacent to the major inner sidewall surface 140B. The major inner sidewall surface 140B can also include two protrusions 144 (only the left side protrusion 144 is shown in FIG. 6, the right side one being symmetrically placed on the other side with a same arrangement) that can respectively cooperate with the slits 139 of the abuttal support 130. Accordingly, the abuttal support 130 can be guided by the guide slots 142 or the protrusions 144 to slide substantially parallel to the direction Y to either stow in the storage pocket 140 (shown with solid lines in FIGS. 5 and 6), or deploy outside the storage pocket 140 (shown with phantom lines in FIGS. 5 and 6).

As shown in FIG. 6, when the abuttal support 130 is stowed in the storage pocket 140, the lateral protrusion 138 can be squeezed against an opposing sidewall surface 140A of the storage pocket 140 to generate an interference fit that can keep the abuttal support 130 in the stowed position. Accidental deployment can be thereby prevented.

If use of the abuttal support 130 is needed, the grip handle 134 can be pulled upward to disengage the lateral protrusion 138 from its interference fit with the sidewall surface 140A. The abuttal support 130 then can be driven to slide outward, until, the edge portions 139A of the slits 139 respectively overcome the obstruction of and pass past the protrusions 144, which consequently become disengaged from the slits 139. The pulling force applied on the abuttal support 130 then can be released, and the edge portion 139A can respectively abut against an upper surface of the protrusions 144 to keep the abuttal support 130 in the deployed second position. The second portion 122 and the abuttal support 130 in the deployed position can lie generally in the same to direction of extension Y.

To limit the outward extension of the abuttal support 130, an upper region of the storage pocket 140 can include a stop surface 146 against which the flange 136 can come into abutment. When the abuttal support 130 slides upward, the contact between the flange 136 and the stop surface 146 can block the abuttal support 130 and prevent its entirely disengaging from the storage pocket 140.

To retract the abuttal support 130, the grip handle 134 can be pushed downward so that the edge portions 139A of the slits 139 are forced to overcome the obstruction of the protrusions 144, whereby the protrusions 144 can cooperate with the slits 139 again. Guided by the movable cooperation between the slits 139 and the protrusions 144, the abuttal support 130 can then slide toward the interior of the storage pocket 140, until the lateral protrusion 138 becomes squeezed against the sidewall surface 140A of the storage pocket 140. The interference fit thereby created can hold the abuttal support 130 in the stowed position.

Figure 7:
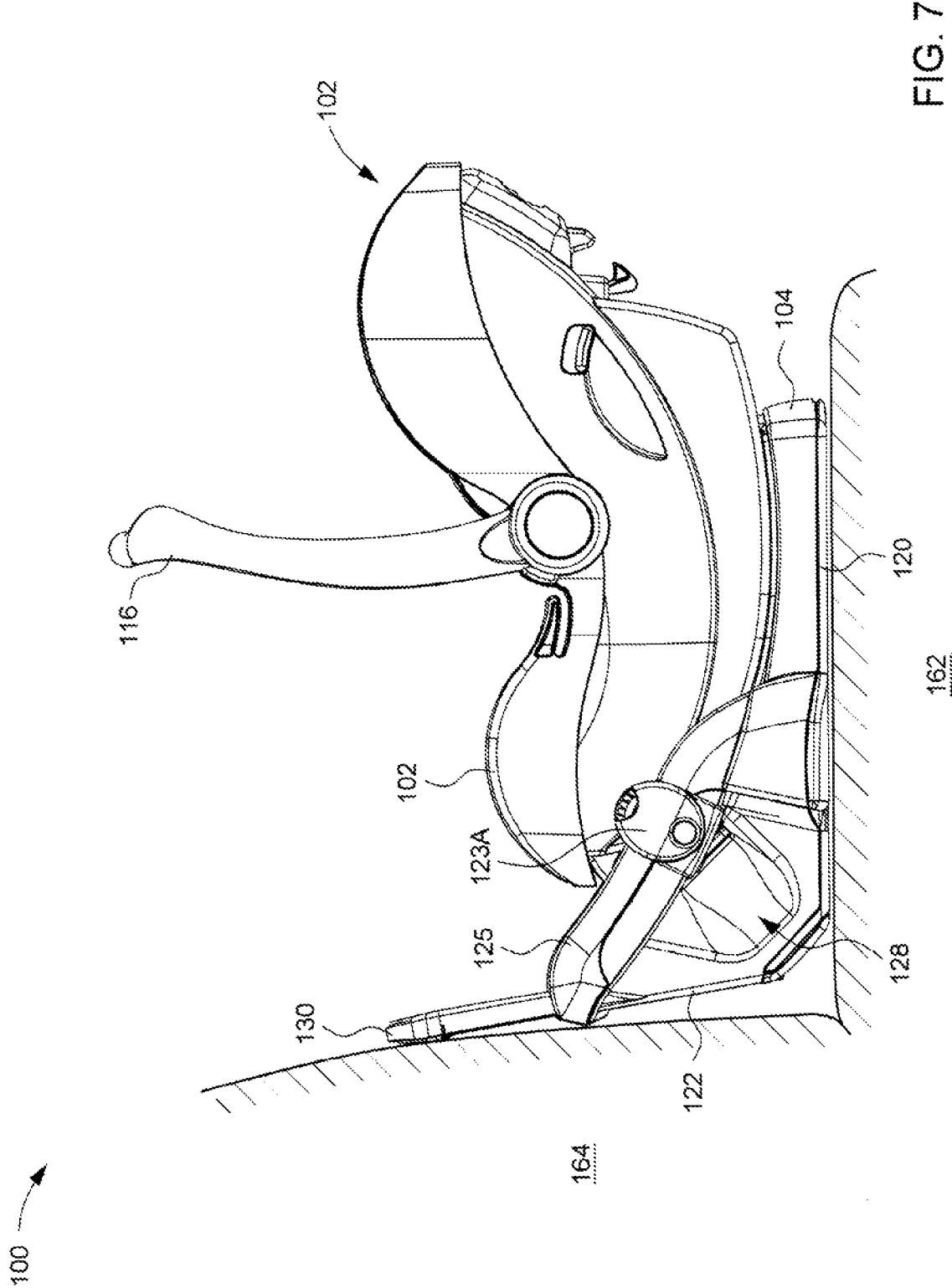
FIG. 7 is a schematic view illustrating the child safety seat assembly in a configuration of use in a vehicle.

FIG. 7 is a schematic view illustrating the child safety seat assembly 100 in a configuration of use in a vehicle. The child safety seat assembly 100 can be installed with the base 104 resting on a vehicle seat 162, and the second portion 122 in close contact with a seatback 164 of the vehicle seat 162. The child seat 102 is placed on the base 104 in a position where the front of the child seat 102 is oriented rearward toward the seatback 164 of the vehicle seat 162, and the seatback 114 of the child seat 102 is at a side opposite to the second portion 122 of the base 104. In this configuration of use facing rearward, the abuttal support 130 can be pulled outward to the deployed position to increase the area of contact between the base 104 and the seatback 164 of the vehicle seat 162. As a result, a larger area of abuttal support 130 can be provided along the vehicle seatback 164, which can increase stability and reduce the risks of the child safety seat assembly 100 being lifted from the vehicle seat 162 during sudden movements or collision of the vehicle. In addition, the deployed abuttal support 130 can also be conveniently used by the child as a footrest.

Figure 8:
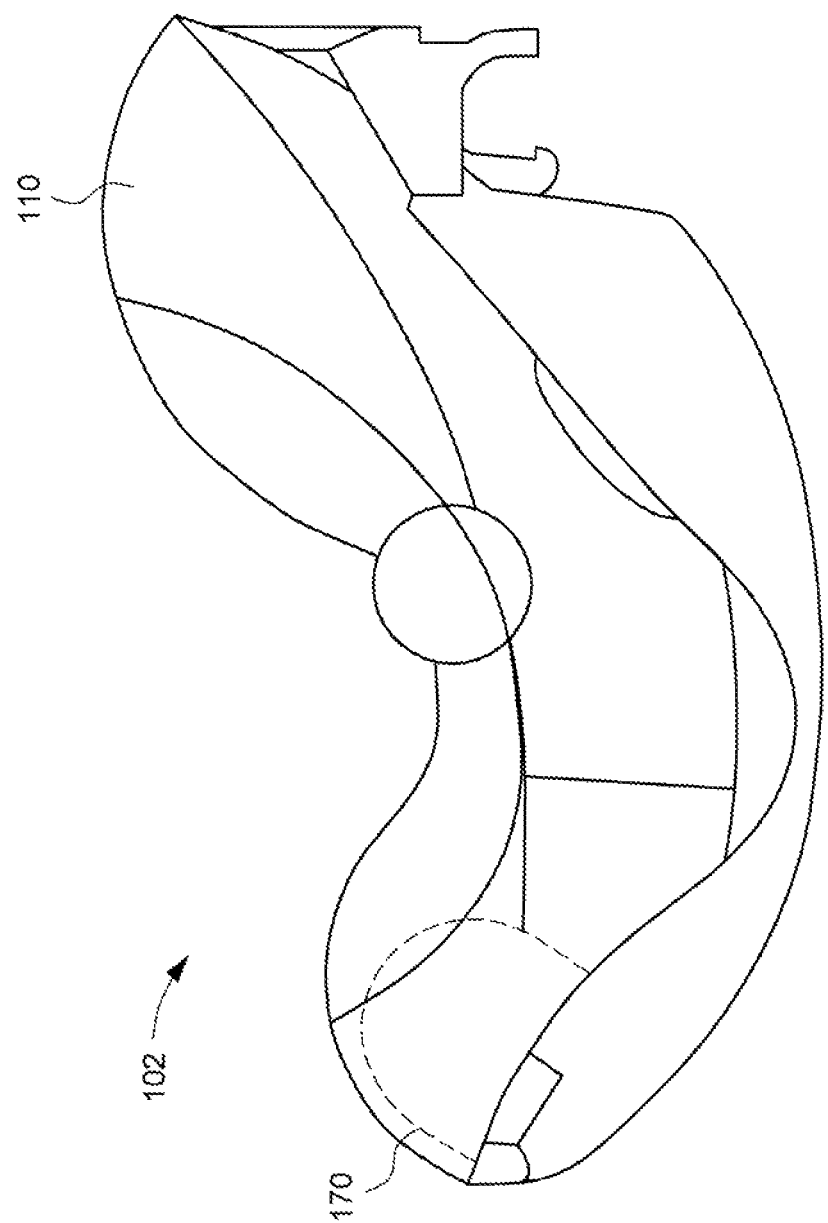
FIGS. 8 and 9 are schematic views illustrating a variant embodiment of the child seat.
Figure 9:
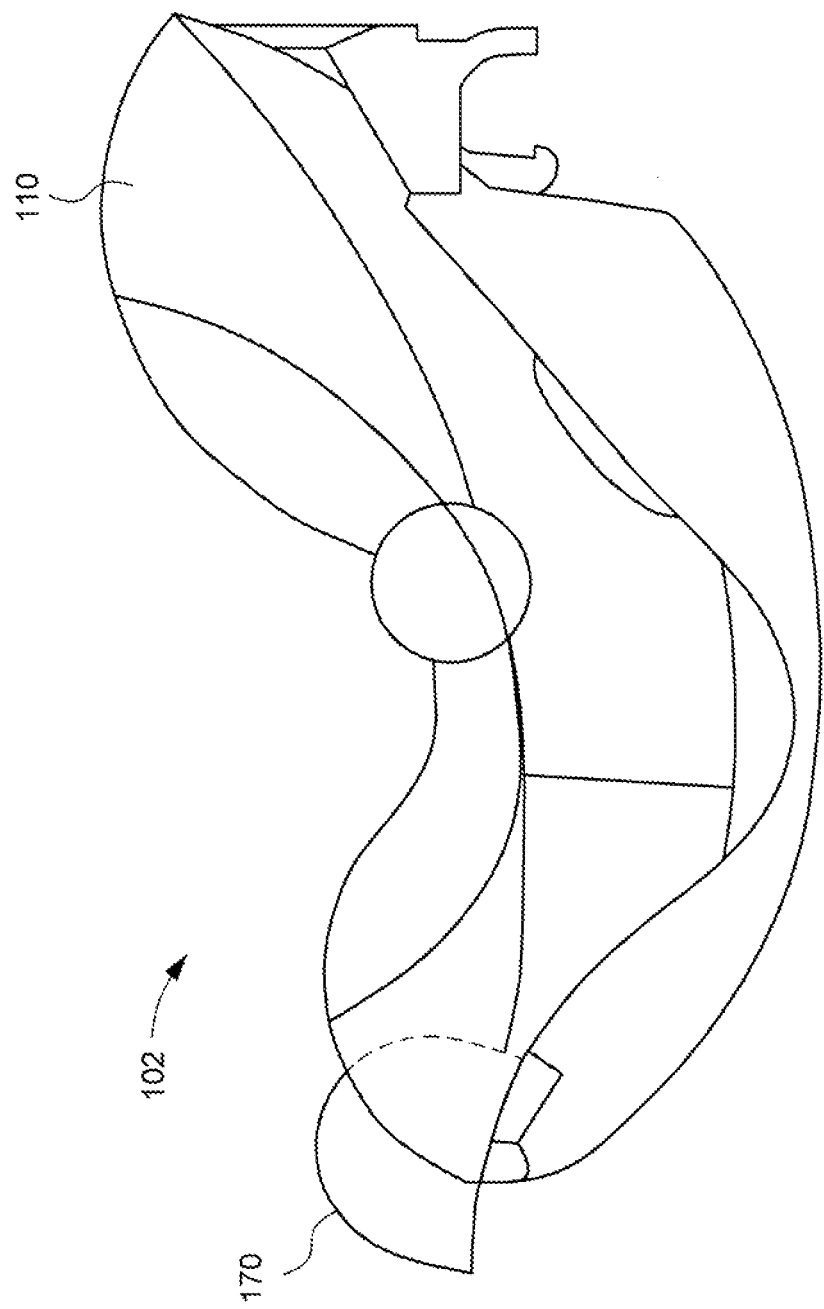

FIGS. 8 and 9 are schematic views illustrating a variant embodiment of the child seat 102. As shown, the child seat 102 can be additionally provided with a movable leg rest pad 170. The leg rest pad 170 can be movable between a retracted position stored in the seat portion 112, and an extended position deployed at the front of the child seat 102 for placement of the child's legs.

At least one advantage of the structures described herein is the ability to provide a child safety seat assembly that is safer in use. The deployed abuttal support can be advantageously used as footrest, and also provide improved abuttal support against a seatback of the vehicle. Accordingly, the child safety seat assembly can be installed facing rearward in a stable and secure manner.

It is worth noting that while the aforementioned embodiments provide a child safety seat assembly that has the child seat and base that may be detachable from each other, the features described herein may be suitable to other constructions of the child seat and base. For example, in alternate embodiments, the base may also be constructed as an integral, not detachable part of the child seat. In this case, the construction of the abuttal support may be likewise implemented to provide the same advantages.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat assembly for seating a child in a vehicle, comprising:
   a child seat having a seatback, and a front end portion for placement of a child's legs;
   a base adapted to assemble with the child seat and attachable with a vehicle seat, wherein the base includes a first portion having an enlarged bottom surface for resting on a vehicle seat, and a second portion joined with the first portion and provided with a storage pocket, the base and the child seat when assembled with each other and secured to the vehicle seat providing protection for a child on the vehicle seat;
   an abuttal support assembled with the base and operable to move relative to the base between a first position stowed in the storage pocket and a second position deployed outward, the abuttal support extending at a forward location relative to the front end portion of the child seat when the base and the child seat are assembled with each other, and the abuttal support when in the second position extending higher than the front end portion of the child seat installed on the base; and
   a holding structure for keeping the abuttal support in the second position.

2. The child safety seat assembly according to claim 1, wherein the abuttal support is adapted to provide a footrest in the second position.

3. The child safety seat assembly according to claim 1, wherein the abuttal support is operable to slide along an axis extending at an inclined angle relative to a direction of extension of the first portion.

4. The child safety seat assembly according to claim 3, wherein the angle is at least equal to or greater than 90 degrees.

5. The child safety seat assembly according to claim 3, wherein the second portion and the abuttal support in the second position lie generally in a same direction of extension.

6. The child safety seat assembly according to claim 1, wherein the abuttal support includes at least one rail that is movably received in a guide slot structure provided in the storage pocket.

7. The child safety seat assembly according to claim 6, wherein at least one outer surface of the rail includes a lateral protrusion movable to come into interference fit against an opposing inner sidewall surface of the storage pocket to hold the abuttal support in the first position.

8. The child safety seat assembly according to claim 1, wherein the abuttal support includes an elongated slit, and the storage pocket includes an inner sidewall surface having a protrusion that is adapted to cooperate with the elongated slit for guiding movement of the abuttal support relative to the storage pocket.

9. The child safety seat assembly according to claim 8, wherein the protrusion disengages from the elongated slit when the abuttal support reaches the second position.

10. The child safety seat assembly according to claim 9, wherein the elongated slit has a lower end that is closed by an edge portion of the abuttal support, the edge portion of the abuttal support resting in contact against the protrusion to hold the abuttal support in the second position, the holding structure for keeping the abuttal support in the second position including the edge portion and the protrusion.

11. The child safety seat assembly according to claim 1, wherein the abuttal support is formed in a single body with a plate shape.

12. The child safety seat assembly according to claim 1, wherein the base is adapted to assemble with the child seat in a detachable manner.

13. The child safety seat assembly according to claim 1, wherein the seatback of the child seat assembled with the base is located at a side of the base opposite to the second portion.

14. The child safety seat assembly according to claim 1, wherein the base is positionable on a vehicle seat with the bottom surface resting on the vehicle seat and the abuttal support lying adjacent to a seatback of the vehicle seat.

15. A child safety seat assembly for seating a child in a vehicle, comprising:
   a child seat;
   a base operable to assemble with the child seat, wherein the base includes an enlarged bottom surface to provide resting support on a vehicle seat, a guiding structure, and an end portion provided with a storage pocket, the base and the child seat when assembled with each other and secured to the vehicle seat providing protection for a child on the vehicle seat; and
   a rigid abuttal support assembled with the base and operable to move relative to the base between a first position where the abuttal support is stowed in the storage pocket, and a second position where the abuttal support is deployed outside the storage pocket and extends upward from an upper surface of the base, the guiding structure guiding movement of the abuttal support relative to the storage pocket from the first position to the second position and from the second position back to the first position.

16. The child safety seat assembly according to claim 15, wherein the abuttal support is configured as a footrest in the second position.

17. The child safety seat assembly according to claim 15, wherein the guiding structure includes a guide slot structure provided in the storage pocket, and the abuttal support includes at least one rail that is movably received in the guide slot structure provided in the storage pocket.

18. The child safety seat assembly according to claim 17, wherein at least one outer surface of the rail includes a lateral protrusion movable to come into interference fit against an opposing inner sidewall surface of the storage pocket to hold the abuttal support in the first position.

19. The child safety seat assembly according to claim 15, wherein the abuttal support is formed in a single body with a plate shape.

20. The child safety seat assembly according to claim 15, wherein the child seat has a front end portion for placement of a child's legs, and the base and the child seat are positionable on a vehicle seat with the bottom surface resting on the vehicle seat and the abuttal support lying above the front end portion of the child seat and adjacent to a seatback of the vehicle seat.

21. A child safety seat assembly comprising:
a child seat having a seatback, and a front end portion for placement of a child's legs;
a base adapted to assemble with the child seat and attachable with a vehicle seat, wherein the base has an enlarged bottom surface for resting on a vehicle seat, and an end portion provided with a storage pocket that is opened on an upper surface of the base, the base and the child seat when assembled with each other and secured to the vehicle seat providing protection for a child on the vehicle seat; and
a rigid abuttal support assembled with the base and operable to move relative to the base between a first position stowed in the storage pocket and a second position deployed outward above the upper surface, wherein when the child seat is installed on the upper surface of the base and the abuttal support is in the second position, the abuttal support is at a forward location relative to the front end portion and extends higher than the front end portion of the child seat.

22. The child safety seat assembly according to claim 21, wherein the base further includes a holding structure for keeping the abuttal support in the second position.

23. The child safety seat assembly according to claim 21, wherein the base further includes a guiding structure for guiding movement of the abuttal support relative to the storage pocket between the first and second positions.

24. The child safety seat assembly according to claim 21, wherein the abuttal support has a transversal dimension that extends substantially across a width of the base.

* * * * *